(12) United States Patent
Takahashi et al.

(10) Patent No.: US 6,397,010 B1
(45) Date of Patent: May 28, 2002

(54) CAMERA

(75) Inventors: Keita Takahashi, Tsukui-gun; Nobuyuki Tanaka, Hidaka; Hiroyuki Ando, Hachioji, all of (JP)

(73) Assignee: Olympus Optical Co., Ltd., Tokyo (JP)

( * ) Notice: Subject to any disclaimer, the term of this patent is extended or adjusted under 35 U.S.C. 154(b) by 53 days.

(21) Appl. No.: 09/597,794

(22) Filed: Jun. 20, 2000

(30) Foreign Application Priority Data

Jun. 21, 1999 (JP) ............................................ 11-174084

(51) Int. Cl.⁷ .......................... G03B 13/36; G03B 15/03
(52) U.S. Cl. ......................................... 396/89; 396/176
(58) Field of Search ............................ 396/89, 176, 155

(56) References Cited

U.S. PATENT DOCUMENTS 5,845,167 A * 12/1998 Funahashi et al. ...... 396/176 X

* cited by examiner

*Primary Examiner*—W. B. Perkey
(74) *Attorney, Agent, or Firm*—Frishauf, Holtz, Goodman, Langer & Chick, P.C.

(57) ABSTRACT

The camera includes a strobe device, a distance-measuring device and a heat insulating section. The strobe device has a light source for irradiating light onto an object at the time of photographing. The distance-measuring device measures the distance to the object. The heat insulating section is provided between the strobe device and the distance-measuring device, so as to prevent the heat generated by the strobe device from being transmitted to the distance-measuring device.

20 Claims, 4 Drawing Sheets

CAMERA

CROSS-REFERENCE TO RELATED APPLICATIONS

This application is based upon and claims the benefit of priority from the prior Japanese Patent Application No. 11-174084, filed Jun. 21, 1999, the entire contents of which are incorporated herein by reference.

BACKGROUND OF THE INVENTION

The present invention relates to a camera, and more specifically to a camera equipped with heat insulating means for preventing heat generated by a strobe device from being transmitted to a distance-measuring device.

Conventionally, a strobe device and a distance-measuring device for measuring the distance to an object are disposed with a predetermined distance between them, in order to prevent an error in distance-measuring from being caused by the heat generated by the strobe device.

In the meantime, the technology in the field of the camera has been advanced so as to increase the magnification of zooming; therefore there is an increasing demand for a higher-precision distance-measuring device, and at the same time, a smaller-sized camera.

In a conventional camera, the strobe device and distance-measuring device cannot be arranged to be adjacent to each other, due to the heat generated by the strobe device. Such a fact limits very much the layout design of the devices, and therefore the downsizing of the camera cannot be achieved.

BRIEF SUMMARY OF THE INVENTION

Therefore, the object of the present invention is to provide a camera equipped with a high-precision distance-measuring device, which can be reduced in size and can avoid an error in distance-measuring, which is caused by the heat generated by the strobe device.

In order to prevent the above-described object, there is provided a camera according to the first aspect of the present invention, comprising:

a strobe device;

a distance-measuring device for measuring a distance to an object; and a heat insulating section provided between the strobe device and the distance-measuring device, so as to prevent heat generated by the strobe device from being transmitted to the distance-measuring device.

Further, there is provided a camera according to the second aspect of the present invention, comprising:

a strobe device;

a distance-measuring device for measuring a distance to an object;

a first wall section provided between the strobe device and the distance-measuring device; and a second wall section provided between the strobe device and the distance-measuring device, such as to form a predetermined gap with respect to the first wall section.

Further, there is provided a camera according to the third aspect of the present invention, comprising:

a strobe device;

a distance-measuring device for measuring a distance to an object; and a heat insulating section which forms an air layer between the strobe device and the distance-measuring device.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
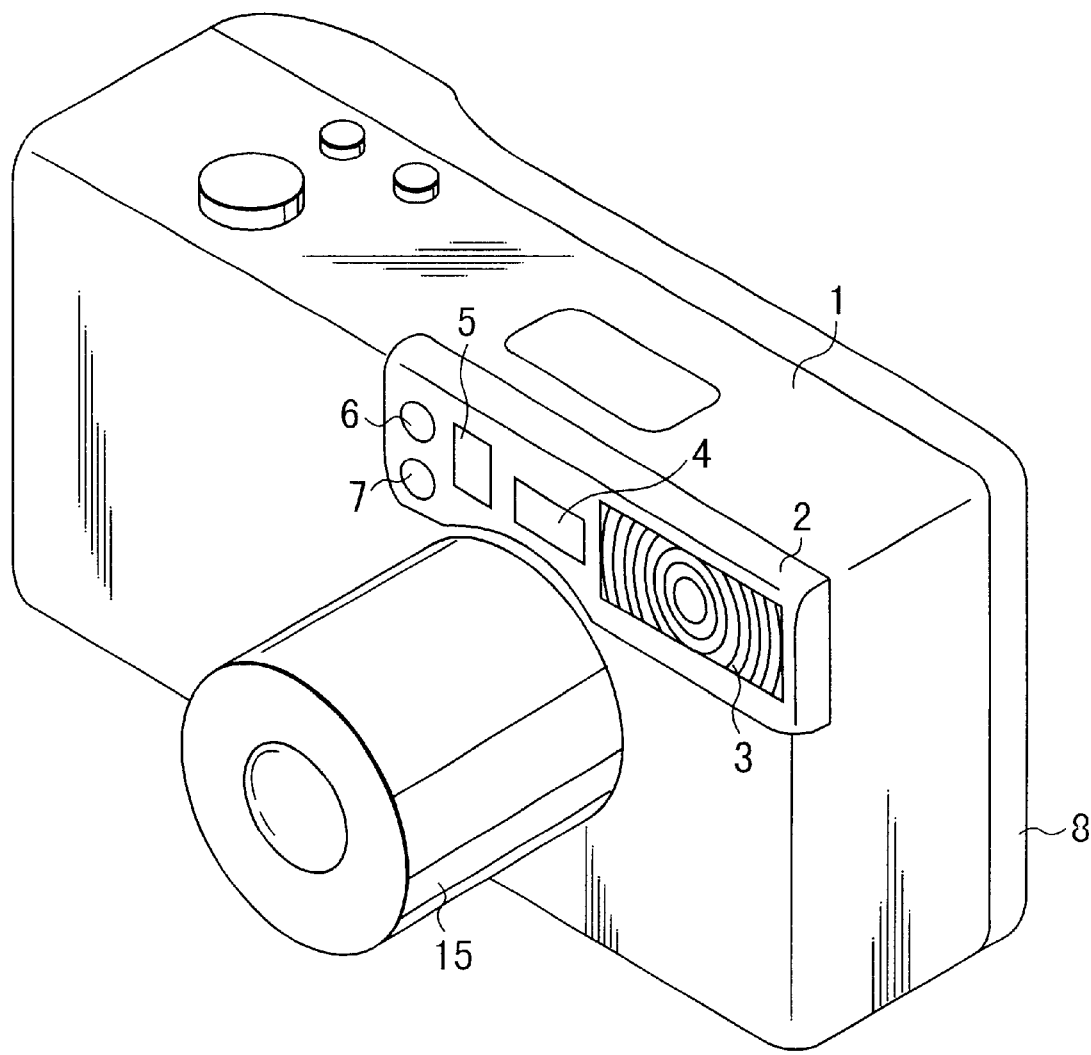
FIG. 1 is a perspective view showing an appearance of a camera.

Embodiments of the present invention will now be described with reference to accompanying drawings. FIG. 1 is a perspective view of an appearance of a camera. As can be seen in FIG. 1, at a section where a front panel 2 is mounted as an exterior member for the front portion of the camera, there are provided a strobe window (ST window) 3, a distance-measuring window 4, a finder window 5, an AE window 6 and a remote control window 7. Further, underneath the front panel 2, a lens barrel unit 15 is provided in such a form that it projects forwards. Further, the camera as a whole is protected by a front cover 1 and a rear cover 8, which serve as an armor member.

Figure 2:
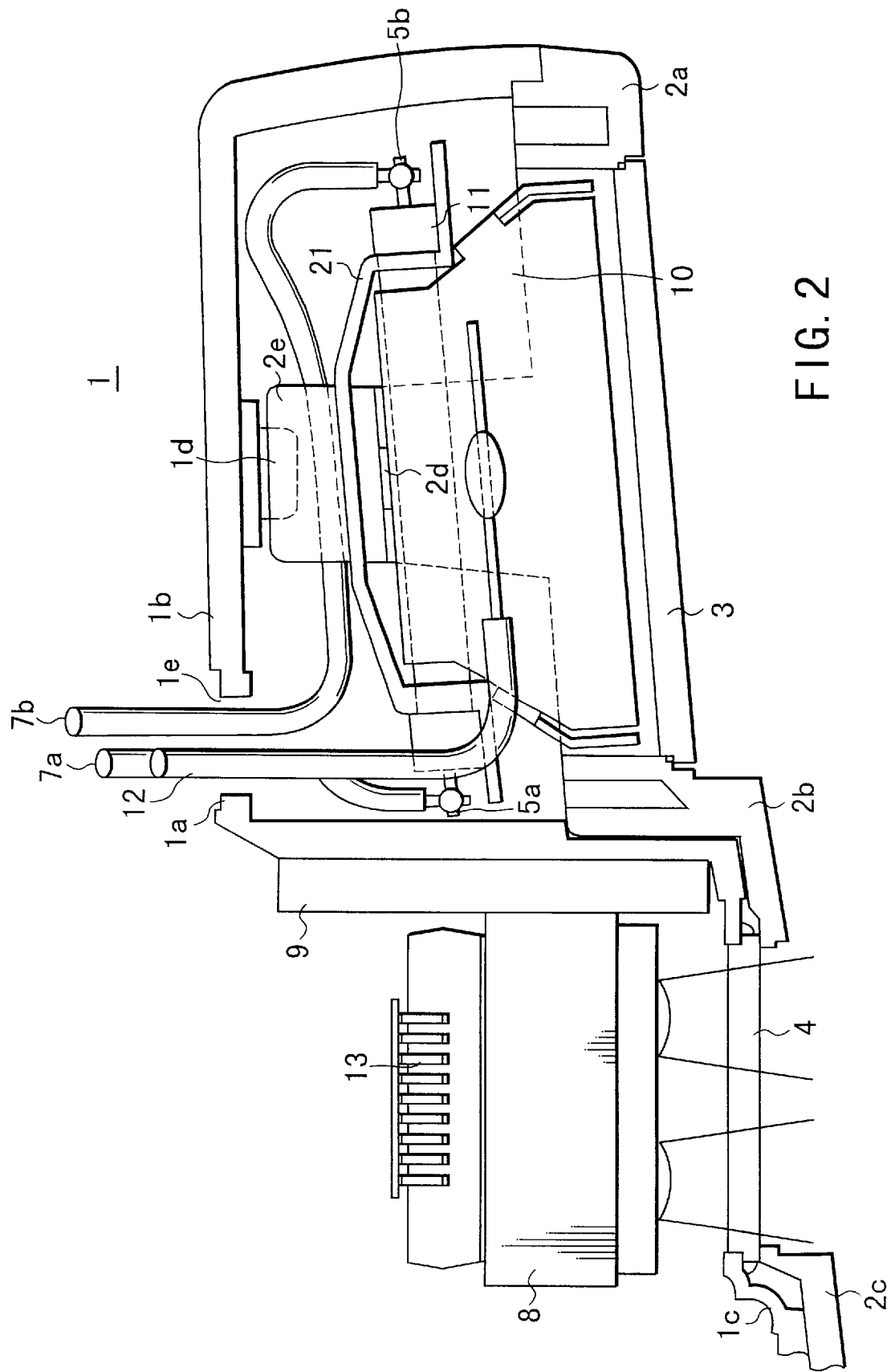
FIG. 2 is a diagram illustrating the structure of the first embodiment of the present invention.

FIG. 2 is a diagram illustrating the structure of the first embodiment of the present invention. First, the structure of the strobe device will now be described. The front cover 1 consists of front cover members 1a, 1b and 1c, with the front cover member 1c covering the front surface of the camera, and the front cover 1a and 1b forming a storage section of the strobe device. The front surface of the strobe device is open. The front cover member 1a has a hole section 1e which is formed so as to guide lead wires and the like into the camera, the lead wires being connected to the strobe device, which will be described later. The strobe window 3 is a light-transmitting panel designed to adjust, for example, the distribution of light from the strobe device, and is situated at such a position that covers the front surface of the storage section of the strobe device. Further, the front panels 2a and 2b are placed between the strobe window 3 and the front cover 1, so as to support the strobe window 3.

In a space formed by the front covers 1a, 1b, the front panels 2a and 2b and the strobe window 3, a xenon (Xe) tube 11 serving as a flashing light generating tube for generating strobe light, is stored, and further a light reflector 10 for reflecting light beams from the xenon tube 11 towards the strobe window 3, provided to cover the light generating portion of the xenon tube 11 is also stored. The light reflector 10 is fixed together with the xenon tube 11 to a reflector support section 2b provided in the front panel 2, by means of a rubber band 21. The rubber band 21 is an elastic part made of, for example, silicon, and is mounted onto each of both ends of the xenon (Xe) tube 11. It is hooked on a rear portion of the reflector support portion 2d, so as to hold the xenon tube 11 is maintained while being pressed against the light reflector 10, and to hold the light reflector 10 while being pressed against the reflector support portion 2d of the front panel 2.

It should be noted that the position of the front panel 2 in the vertical direction of the sheet of the drawing is determined as a positioning portion 1d provided in the front cover 1b and a positioning portion 2e provided in the front panel engage with each other in the rear section of the reflector support section 2d.

To terminal groups 5a and 5b provided in both ends of the xenon (xe) tube 11, one ends of lead wires 7a and 7b are connected, and they extend out from the hole section 1e made in the front cover 1a and 1b. Further, one end of a trigger lead wire 12 is soldered to a predetermined position of the outer surface of the light reflector 10, and further extends out from the hole section 1e made in the front cover 1a and 1b.

Further, an AF module 8 serving as a distance-measuring device is disposed on a side where the front cover 1a of the strobe device is provided. In this embodiment, as the distance-measuring device, a conventionally known passive-type distance-measuring means, having at least one pair of optical elements and one pair of photoelectric conversion elements, for measuring the distance to an object, by forming the object image on the above-mentioned photoelectric conversion elements and finding the difference between the positions of the images formed.

Between the AF module 8 and the front cover 1a, a heat insulating member 9 serving as heat insulating means is provided. As the material for the heat insulating member 9, those having a low heat conductivity, such as glass fibers (glass wool), foam polystyrene and urethane, are used. In front of the AF module 8, a distance-measuring window 4 through which light from the object is input, is arranged to lie side-by-side with the strobe window 3. The distance-measuring window 4 is supported by the front cover 1a, 1c and the front panel 2b and 2c. The reference numeral 13 denotes a section of the sensor terminal portion, which is connected to the control system of the camera.

Figure 3:
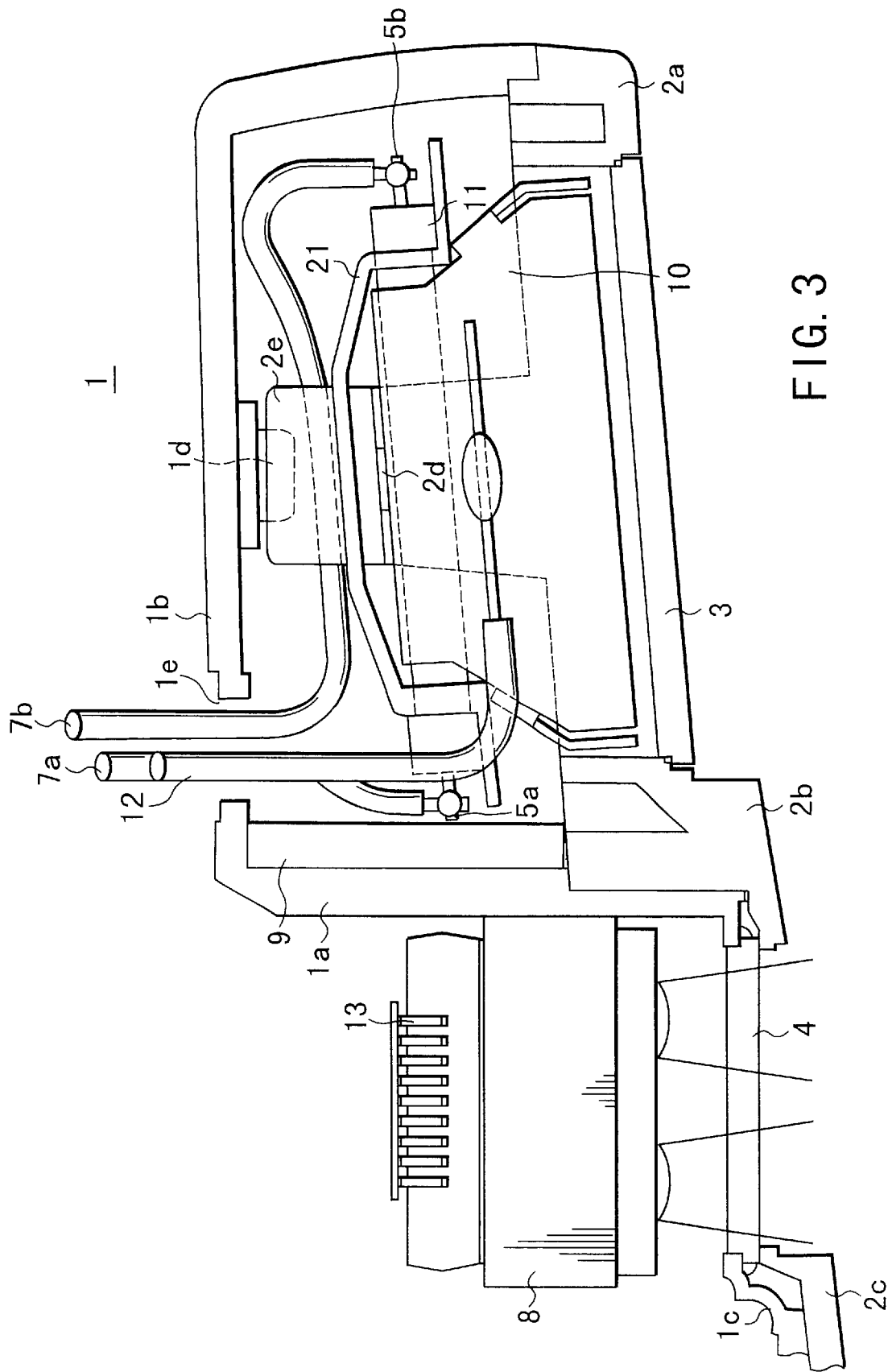
FIG. 3 is a diagram illustrating the structure of the second embodiment of the present invention.

FIG. 3 is a diagram illustrating the structure of the second embodiment of the present invention. In the first embodiment described above, the heat insulating member 9 is provided outside the storage section of the strobe section, which is formed by the front cover 1a and the front cover 1b. By contrast, the second embodiment is characterized in that a heat insulating material 9 is formed to be in tight contact with the storage section of the strobe device and the front cover 1a as well. The other sections are similar to those of the first embodiment.

According to the first or second embodiment of the present invention, the heat insulating member 9 is provided between the distance-measuring device including the AF module 8 and the strobe device, and thus, the heat generated by the strobe device can be prevented from being transmitted to the AF module side. With this structure, the distance-measuring device and the strobe device can be disposed to be close to each other, and therefore it becomes possible to provide a high-precision distance-measuring device free from an error in distance-measuring, which is caused by the heat generation of the strobe device while achieving the reduction in size of the camera. Furthermore, when the first and second embodiments are combined together, and a plurality of heat insulating members 9 are provided, even a more heat insulating effect can be obtained.

Figure 4:
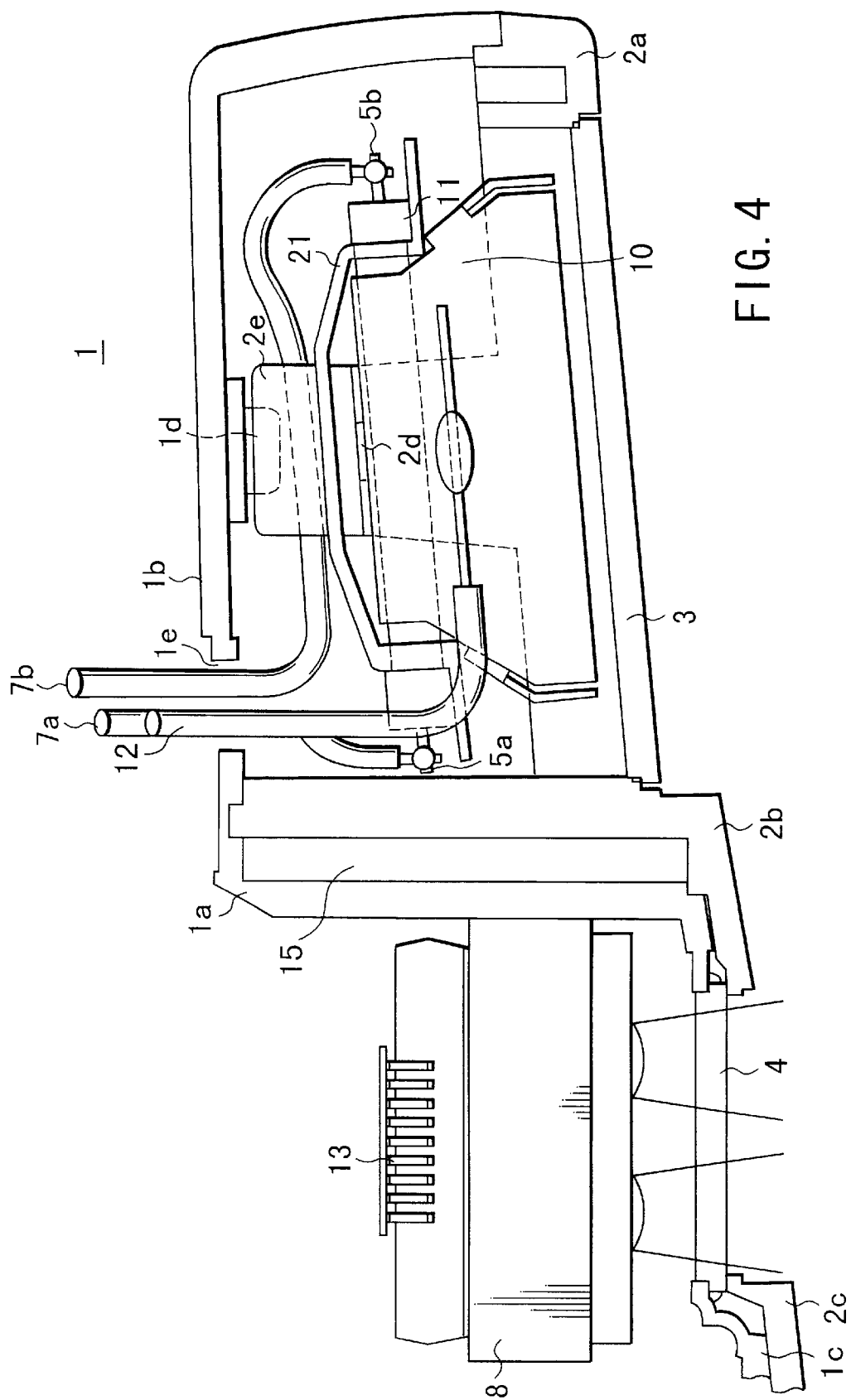
FIG. 4 is a diagram illustrating the structure of the third embodiment of the present invention.

FIG. 4 is a diagram illustrating the structure of the third embodiment. The features of the third embodiment are that the heat insulating member 9 is not used, but the end portion of the front cover 1a which forms the storage section of the strobe is further extended so as to cover the distance-measuring device side, and an air layer (heat insulating means) 15 is formed with the front panel 2b and the front cover 1, between the strobe device and the distance-measuring device. The other structures are similar to those of the first embodiment.

With the structure of the third embodiment, not only the advantages of the first embodiment, but also the following additional advantages can be obtained. That is, since the heat insulating member becomes no longer necessary, and therefore the production cost can be reduced, and at the same time, the number of steps in its assembly operation can be reduced.

As described, according to the present invention, it becomes possible to provide a camera equipped with a high-precision distance-measuring device, which can reduce in the size of the camera and avoid an error in distance-measuring, which is caused by the heat generated by the strobe device.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera comprising:
   a strobe device;
   a distance-measuring device for measuring a distance to an object; and
   a heat insulating section provided between the strobe device and the distance-measuring device, so as to prevent heat generated by the strobe device from being transmitted to the distance-measuring device.

2. A camera according to claim 1, wherein the heat insulating section includes a heat insulating member.

3. A camera according to claim 2, wherein the heat insulating member contains glass fibers.

4. A camera according to claim 2, wherein the heat insulating member contains foam polystylene.

5. A camera according to claim 2, wherein the heat insulating member contains urethane.

6. A camera according to claim 1, further comprising:
   a cover member for covering the strobe device; and
   a heat insulating member, provided outside the cover member and on the distance-measuring device side, for forming the heat insulating section.

7. A camera according to claim 6, wherein the cover member is made of an armor member which covers at least a front surface of the camera.

8. A camera according to claim 1, further comprising:
   a cover member for covering the strobe device; and
   a heat insulating member, provided inside the cover member and on the distance-measuring device side, for forming the heat insulating section.

9. A camera according to claim 8, wherein the cover member is made of an armor member which covers at least a front surface of the camera.

10. A camera according to claim 1, wherein the distance-measuring device includes at least one pair of optical elements for receiving light beams from the object and one pair of photoelectric conversion elements, and measures the distance to the object by comparing output signals of said pair of photoelectric conversion elements with each other.

11. A camera comprising:
a strobe device;
a distance-measuring device for measuring a distance to an object;
a first wall section provided between the strobe device and the distance-measuring device; and
a second wall section provided between the strobe device and the distance-measuring device, with a predetermined gap being formed between the second wall section and the first wall section.

12. A camera according to claim 11, wherein the gap formed between the first wall section and the second wall section, functions as heat insulating means for preventing the heat generated by the strobe device from being transmitted to the distance-measuring device.

13. A camera according to claim 11, wherein at least one of the first and second wall sections is made of a cover member which covers the strobe device.

14. A camera according to claim 13, wherein the cover member is made of an armor member which covers at least a front surface of the camera.

15. A camera according to claim 11, wherein the distance-measuring device includes at least one pair of optical elements for receiving light beams from the object and one pair of photoelectric conversion elements, and measures the distance to the object by comparing output signals of said pair of photoelectric conversion elements with each other.

16. A camera comprising:
a strobe device;
a distance-measuring device for measuring a distance to an object; and
a heat insulating section which forms an air layer between the strobe device and the distance-measuring device.

17. A camera according to claim 16, wherein at least part of the heat insulating section is made of a cover member which covers the strobe device.

18. A camera according to claim 17, wherein the heat insulating member forms the cover member, which is made of an armor member which covers at least a front surface of the camera, and an exterior member mounted on the armor member.

19. A camera according to claim 18, wherein the strobe device comprises a flashing light generating tube serving as a light source, a light reflector for reflecting part of a light beam from the flashing light generating tube, towards a predetermined direction, and a strobe window for irradiating the reflection light from the light reflector and part of a light beam generated from the flashing light generating tube, towards a predetermined direction.

20. A camera according to claim 16, wherein the distance-measuring device includes at least one pair of optical elements for receiving light beams from the object and one pair of photoelectric conversion elements, and measures the distance to the object by comparing output signals of said pair of photoelectric conversion elements with each other.

* * * * *